Figure 1:
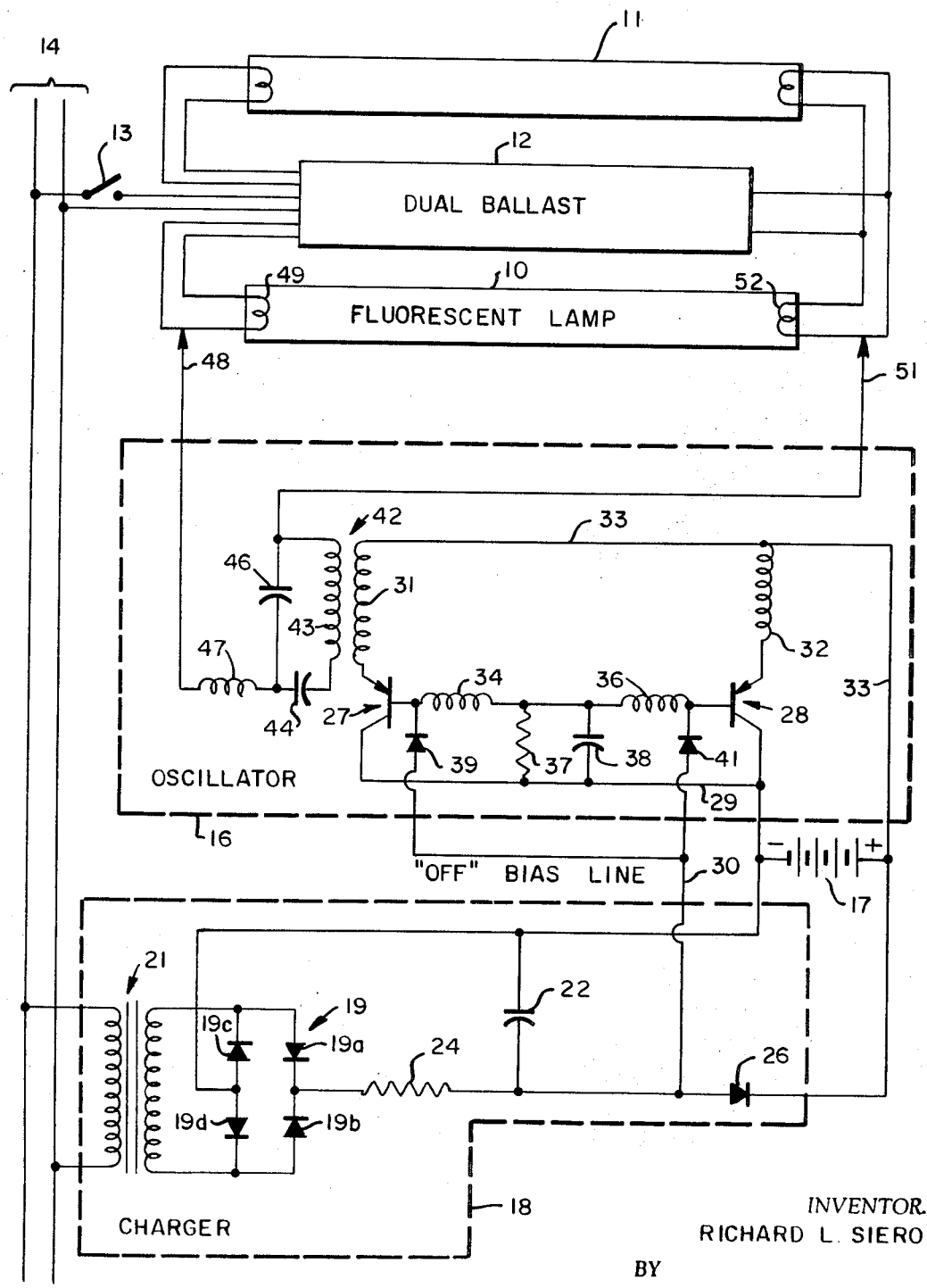

United States Patent

Sieron

[15] 3,684,891

[45] Aug. 15, 1972

[54] FAIL-SAFE SOLID-STATE EMERGENCY LIGHTING POWER SUPPLY AND TRANSFER CIRCUIT

[72] Inventor: Richard L. Sieron, Old Saybrook, Conn.

[73] Assignee: Dual-Lite Company, Newtown, Conn.

[22] Filed: Sept. 28, 1970

[21] Appl. No.: 75,815

[52] U.S. Cl. ................ 307/66, 307/150, 315/DIG. 7, 315/86
[51] Int. Cl. .............................................. H02j 9/06
[58] Field of Search ................ 307/66, 64, 150, 157; 315/DIG. 7, 5.2, 86, 171

[56] References Cited

UNITED STATES PATENTS

| | | | |
|---|---|---|---|
| 3,189,788 | 6/1965 | Cady | 307/66 X |
| 3,002,105 | 9/1961 | Cady | 307/64 |
| 3,356,891 | 12/1967 | Godard | 307/66 X |
| 3,371,244 | 2/1968 | Boland | 315/DIG. 7 |
| 3,448,335 | 6/1969 | Gregory et al. | 315/86 X |

*Primary Examiner*—R. F. Staubly
*Assistant Examiner*—B. A. Reynolds
*Attorney*—Mattern, Ware & Davis

[57] ABSTRACT

A self contained power supply unit for standard "rapid-start" fluorescent lamps employing a full-wave rectifier to charge a battery and a common-collector solid state oscillator circuit employing two PNP transistors which are normally biased to their non-oscillating mode by the charging potential from the full-wave rectifier. The oscillator output is delivered directly to a pair of clamp-on leads respectively anchored to the terminals of a standard "rapid-start" fluorescent lamp in parallel with the lamp's normal ballast circuit. The clamp-on leads are connected by only two wires to the oscillator output circuit. The oscillator transistors are normally biased in their non-oscillating mode, and the only power consumed by the circuit is the power required for continuous battery charging, the charging current being drawn through a current-limiting resistor and a diode. In the event of main power line failure, the battery continues to supply the normal DC potential to drive the amplifier, but the biasing potential derived from the full-wave rectifier is no longer present and the oscillator transistors are therefore no longer biased in their non-oscillating mode. Powered by the emergency battery, the oscillator produces high frequency sinusoidal output current which is delivered through the clamp-on leads directly to the terminals of the fluorescent lamp during main power line failure. When main line power is restored, the full-wave rectifier charging potential is again delivered to bias the oscillator transistors to their non-oscillating mode, automatically returning the emergency power supply unit to its battery charging mode.

3 Claims, 1 Drawing Figure

INVENTOR.
RICHARD L. SIERON

BY

MATTERN WARE & DAVIS
ATTORNEYS

FAIL-SAFE SOLID-STATE EMERGENCY LIGHTING POWER SUPPLY AND TRANSFER CIRCUIT

BACKGROUND OF THE INVENTION

This invention relates to emergency power supplies for emergency lighting and for other emergency electrical apparatus required to be fully operative during emergency power failure conditions.

Tragic fires in restaurants and other public places have led to the enactment of laws in many jurisdictions requiring that emergency lighting and other emergency electrical systems be provided for the protection of the public with independent, self-contained power supply circuits usually employing storage batteries to provide emergency power in the event of power failure.

Installation of fluorescent lights in place of incandescent bulbs as standard illumination fixtures in many public buildings has made the provision of direct current battery-operated emergency power supply systems difficult, because of the requirement that "rapid-start" fluorescent lights have their filaments heated by AC power and their electrodes driven by AC current, since they produce illumination on a glow discharge principle rather than from an incandescent filament.

The majority of fluorescent lamps used in public buildings and other large buildings are of the "rapid-start" variety which utilizes filaments that are continually energized. These hot filaments are the electron-emitting surfaces for the main gaseous discharge in the tube. These commonly used "rapid start" fluorescent lamps should not be operated cold (without filament power) unless the applied voltage is smoothly fluctuating (nearly sinusoidal). This makes DC powered choppers and vibrators producing square waveforms and abruptly- interrupted potentials unsuitable unless they also provide filament heating power to minimize damage to the filaments.

The "transfer circuits" employed to connect an emergency power supply to the conventional lamp and to disconnect an emergency power supply after termination of a power failure customarily employ heavy duty relays energized by line power and de-energized by a line power failure, dropping their contacts to close the emergency power supply circuit. Dust, corrosion and mechanical failures often interfere with the proper operation of such transfer relays.

Because conventional "rapid-start" fluorescent lamps require separate power supply current provided to heat their filaments and to provide illumination power for the glow discharge, conventional emergency power supply systems require at least four connecting wires running from the emergency power supply to the fluorescent lamps, complicating the labor of installation. Four output transformer taps are connected through four separate wires to a special, isolated fluorescent lamp in both Gregory U.S. Pat. No. 3,448,335 and Godard U.S. Pat. NO. 3,356,891, making the solid state emergency power supply circuits disclosed in these patents unsuitable for parallel installation across a standard, already-installed fluorescent lamp.

SUMMARY OF THE INVENTION

The self-contained, unitary, emergency power supply circuits of the present invention successfully overcome the many disadvantages of prior emergency power systems. Only two wires lead from these emergency power supply circuits to the fluorescent lamp. Solid state switching eliminates reliance upon fallible electromagnetic relays. The need for filament heating current is eliminated by the delivery of high frequency sinusoidal waveform alternating current directly to the electrodes of the fluorescent lamp. A "common-collector" two-transistor oscillator is connected by a single bias line to a single full-wave rectifier, delivering DC bias potential directly to the base terminals of both transistors. This provides on-off transfer switching bias, maintaining the oscillator in its non-oscillating mode at all times when line power is available.

Interruption of line power automatically eliminates this "off" bias potential, and the oscillator immediately provides the required sinusoidal waveform high frequency alternating current output utilized to supply emergency power to the fluorescent lamp.

Restoration of line power immediately restores "off" bias potential to the base terminals of the two oscillator transistors, and resumes the emergency storage battery charging operation of the system in its dormant mode.

The emergency power supply circuits of this invention are characterized by their unique simplicity, utilizing a single full-wave rectifier and two transistors to provide alternative battery charging and fluorescent lamp driving operations.

Accordingly, a principal object of the invention is to provide a self-contained emergency power supply system utilizing the output potential of a single full-wave rectifier to provide automatic transfer switching of the system from its emergency power delivery mode to its dormant, battery-charging mode.

Another object of the invention is to provide emergency power supply systems capable of operating a standard fluorescent lamp, and connected to the lamp by only two emergency power delivery wires.

A further object of the invention is to provide emergency fluorescent lamp power supply circuits incorporating a resonant L-C tank circuit in the lamp-driving oscillator output circuit, delivering sinusoidal waveform high frequency alternating current while simultaneously serving to isolate the fluorescent lamp's conventional ballast and associated circuitry from the emergency power supply circuitry by forming a high pass filter blocking the admission of conventional 60 Hz power to the emergency power supply circuit.

Still another object of the invention is to provide self-contained emergency power supply circuitry employing a single full-wave rectifier for alternate lamp power operation and battery-charging operation employing a solid state oscillator which is activated automatically by failure of line power without the use of electromagnetic relays or other switches interposed in series between the battery and oscillator and which is also inactivated automatically by restoration of line power.

A further object of the invention is to provide such self-contained emergency power supply circuitry capable of delivering sinusoidal alternating current emergency power at open circuit voltage sufficiently high to ignite the tube and with sinusoidal waveform and thus to eliminate the need for filament heating current in conventional "rapid-start" fluorescent lamps driven thereby.

Other and more specific objects will be apparent from the features, elements, combinations and operating procedures disclosed in the following detailed description and shown in the drawing.

THE DRAWING

FIG. 1 is a schematic circuit diagram illustrating a preferred embodiment of the present invention incorporating an emergency storage battery, a battery-charger circuit employing a single full-wave rectifier, a common-collector two-transistor oscillator and a single bias line delivering "off" bias potential from the full wave rectifiers to the base terminals of the oscillator transistors, performing the automatic transfer function required to activate and deactivate the emergency power supply circuit upon respective interruption and resumption of normal line power, and delivering emergency power through only two leads to the electrodes of a conventional fluorescent lamp.

The separate units of circuitry combined to form the emergency power supply circuit in the preferred form of the present invention are shown in the schematic diagram of FIG. 1. The fluorescent lamp 10 serving as the emergency illumination source is a standard "rapid-start" fluorescent lamp connected with a companion lamp 11 across a "dual ballast" circuit 12 which is connected by an on-off switch 13 to a power line 14. The dual ballast circuit 12 includes choke coils, a shunt start capacitor and filament windings forming a standard commercial "rapid-start" fluorescent lamp and ballast assembly with the lamps 10 and 11. The "rapid-start" fluorescent lamp 10 chosen for emergency duty may be either one powered by a single lamp ballast or may be one of the two powered by a dual ballast 12, as shown in FIG. 1. If the latter, then the dual ballast 12 must be of the type commonly available which utilizes a starting capacitor placed in shunt across one of the two lamps 10 and 11. The lamp 10 chosen for emergency duty must be the one lacking this shunt capacitor since it acts as a short circuit to the high frequency emergency power. Normally, the lamp 10 in a dual ballast configuration that should be used because it does not have this shunt starting capacitor is provided with color-coded ballast leads which are blue on one end only.

Shown beneath lamp 10 in FIG. 1 is an inverter or oscillator circuit 16 deriving its power from an emergency storage battery 17 which is continuously charged, in the battery-charging mode of the system, by a battery charger 18 incorporating a full-wave rectifier 19 comprising four diodes connected across the output winding of a charger transformer 21 and delivering direct current charging potential smoothed by a capacitor 22 by way of a current limiting resistor 24 and a diode 26.

The oscillator 16 is a "common collector" oscillator in which the collectors of two PNP transistors 27 and 28 are connected by a common collector line 29 to the negative terminal of the emergency storage battery 17. The emitters of the transistors 27 and 28 are respectively connected to windings 31 and 32 of the oscillator output transformer whose opposite ends are connected by a common line 33 to the positive terminal of the emergency storage battery 17. The bases of transistors 27 and 28 are respectively connected to windings 34 and 36 of the oscillator output transformer, whose opposite ends are connected through a bias resistor 37 in parallel with a capacitor 38 to the common collector line 29.

A single "off" bias line 30 joins the junction of current limiting resistor 24 and diode 26 in the charger 18 circuit via two branches through diodes 39 and 41 to the respective bases of transistors 27 and 28, delivering positive potential developed by the full-wave rectifier 19 across smoothing capacitor 22 directly to the bases of both transistors 27 and 28 whenever line power is delivered through charger transformer 21 to the full-wave rectifier diode circuit 19. By this means the common collector, two-transistor oscillator circuit 16 is biased in its non-oscillating mode at all times when line power is available.

The desired positive "off"-biasing potential of the bases of transistors 27 and 28 relative to their emitters is maintained by charger 18 because the DC voltage delivered by the pairs of diodes 19a–19c and 19d–19b of full wave rectifier 19 is always greater in magnitude than the voltage of battery 17. This is assured when the battery is fully charged because the secondary voltage of transformer 21 is sufficiently great to deliver the required potential. When the charger 18 is delivering charging current to the battery 17 after the battery has become fully or partially discharged, the voltage drop occurring through the two diodes 39 and 41 interposed in the "off"-bias line 30 will be less than the voltage drop across diode 26. This assures that the positive "off"-bias potential at the bases of transistors 27 and 28, relative to their emitters directly connected to the positive terminal of battery 17, will be great enough to assure non-oscillating or "off" biasing of the oscillator 16.

Interruption of line power eliminates the DC potential developed by charger transformer 21 and diode bridge 19. The discharge of capacitor 22 through diodes 39 and 41 and resistor 37 rapidly brings the potential of the bases of transistors 27 and 28 down to the point where the base-emitter junction can become forward biased. By this means the "off" or oscillation blocking bias is removed from the two transistors automatically by the interruption of line power, and the oscillator 16 powered by emergency storage battery 17 is thus transferred immediately to its oscillating mode.

The oscillator output transformer 42 is provided with an output winding 43 incorporating a large plurality of turns of fine wire in series with a capacitor 44. Another capacitor 46 is connected in parallel across the output transformer winding 43 and capacitor 44, and the junction between the two capacitors 44 and 46 is connected by way of a choke coil 47 to a terminal tap 48 which is preferably a toothed pinch-clamp connector secured to the electrode 49 of fluorescent lamp 10.

The opposite end of oscillator output transformer winding 43 at its junction with capacitor 46 is connected by a second terminal tap 51 to the opposite electrode 52 of fluorescent lamp 10. The two spring clamped terminals 48 and 51 are preferably formed with sharp teeth capable of penetrating the normal insulation of the fluorescent lamp electrode connections leading to electrodes 49 and 52. By this means the terminal taps 48 and 51 may be quickly and easily applied by squeezing and releasing them in juxtaposition over the terminal leads of lamp electrodes 49 and 52. The two terminal taps 48 and 51 form the only connection between the charger 18 and oscillator 16 of the emergency power supply circuits of this invention and the standard "rapid-start" fluorescent lamp 10, which may be any one of a large plurality of "rapid-start" fluorescent lamps installed in a restaurant or other public room.

The only current drawn by the device while line power is available in line 14 is the current required for charging emergency storage battery 17, since oscillator 16 is biased in its non-oscillating mode by the "off" bias line 30. Normal lamp power supplied by the ballast 12 to fluorescent lamp 10 is isolated from the oscillator 16 by the high pass filter action afforded by capacitor 44. The basic waveform produced by the oscillator would be a square wave except that the L-C tank circuit formed by choke 47 and capacitor 46 converts the square wave to a sinusoidal waveform. During the non-oscillating mode of oscillator 16, the high pass filter capacitor 44 blocks conventional lamp driving alternating current of much lower frequencies delivered by the conventional dual ballast 12. For example, the oscillator 16 may be designed to provide high frequency sinusoidal waveform lamp-driving current having a frequency of 10 KHz, while dual ballast 12 in normal operation supplies fluorescent lamp 10 with alternating current of 60 Hz.

The high open circuit voltage supplied by the oscillator 16 facilitates igniting the tube and the sinusoidal oscillator waveform eliminates the need for heating of the electrodes 49 and 52, producing normal glow discharge operation of fluorescent lamp 10 with cold electrodes.

Unlike the Godard U.S. Pat. No. 3,356,891 utilizing two separate rectifier circuits, one for emergency battery charging and the other for driving a "priming" or transfer device circuit, the emergency power supply circuits of the present invention employ only a single, full-wave rectifier 19 which is utilized simultaneously, at all times when line current is delivered through line 14, for supplying battery-charging current to emergency storage battery 17 and for providing the "off" bias through diodes 39 and 41 directly to the bases of transistors 27 and 28.

Accordingly, the use of a common-collector, two-transistor oscillator circuit permits both transistors to be biased and unbiased simultaneously. The combination of this circuit with the output transformer winding 43, choke 47 and capacitors 44 and 46 forming a high pass filter resonant L-C tank circuit, produces high frequency sinusoidal waveform lamp driving alternating current only when line power is interrupted. Restoration of line power immediately restores "off" bias to both transistors 27 and 28, terminating the oscillating operation of oscillator 16, and restoring the circuit again to its dormant, battery-charging mode while the capacitor 44 effectively isolates the oscillator 16, battery 17 and charger 18 from fluorescent lamp 10.

TABLE I

Representative Values of Circuit Components

| | | |
|---|---|---|
| Diodes 19a, b, c, d | ) | 50 PIV |
| Diodes 26, 39, 41 | ) | 1 amp. |
| Transformer 21 | | 60 Hz. 115v. |
| Secondary: | | 28v. center tapped |
| Oscillator Output Transformer | Ferroxcube Potcore, type | 30193B7 |
| Windings 31, 32: | | 5 turns 020 AWG |
| 34, 36: | | 7 turns 024 AWG |
| Secondary Winding 43: | | 280 turns 034 AWG |
| Resistor 24: | | 37 ohms for a 4 Amp.-hour battery (May be changed to match size of battery selected.) |
| Battery 17: | | Sealed Ni-Cad, 12v. |
| Resistor 37: | | 200 ohms |
| Capacitor 22: | | 250 uF |
| 38: | | 1 uF |
| 44: | | 0.015 uF |
| 46: | | 0.0034 uF |
| Choke Coil 47: | | 64 mH |

It should be noted that bias potential delivered by the "off" bias line through diodes 39 and 41 results in current flow only through resistor 37. Being blocked by the reverse biased emitter-base junctions of transistors 27 and 28, no portion of this current flows through battery 17, and the only charging current delivered to the battery is that delivered by the charger via diode 26. The oscillator circuit is specially designed to avoid any direct current path from transistor base to emitter, thereby avoiding any sneak charging paths through the battery.

By utilizing "off" bias line 30 delivering the non-oscillating mode bias to the bases of transistors 27 and 28, all continuing power drains of conventional electromagnetic relay transfer devices are completely eliminated. Such alternative switching devices as power transistors or silicon control rectifiers customarily exhibit a forward voltage drop when in the on condition, and this causes a significant power loss when they are used with emergency storage batteries of 12 volts or less, in the battery voltage ranges common with systems of this kind. These power losses and the associated circuit complexities found in power transistor or SCR switching circuits and auxiliary components are all eliminated by the emergency power supply systems of the present invention.

The preferred emergency battery power supply circuits of this invention thus provide emergency power for standard "rapid-start" fluorescent lamps, and no special lamps or special ballast connections are required. Utilizing only two terminal taps 48 and 51, the power supply circuits of this invention may be connected to any standard "rapid-start" fluorescent lamp 10 conveniently selected near an exit or stairway at any desired location within a restaurant or public building. The connection of a charger circuit 18 to the power line and the connection of terminal taps 48 and 51 to the selected fluorescent lamp 10 are the only connections needed to place these systems in operation, and no special wiring or multiple terminal connections to special fluorescent lamps are required.

A single full-wave rectifier 19 provides both battery charging current and transfer switching operation, entirely eliminating the power losses of power transistors or silicon control rectifier transfer devices, while likewise avoiding the fallibilities and power losses inherent in electromagnetic relay transfer devices. High frequency sinusoidal waveform emergency power supplied to fluorescent lamp 10 illuminates the lamp during power failures without interfering with companion lamp 11 or dual ballast 12, and the filter circuit components of this emergency power supply system effectively isolate the system from fluorescent lamp 10 and its associated circuitry to assure that conventional power line operation of dual ballast 12 and lamps 10 and 11 will not interfere with the operation of the emergency power supply systems of this invention.

Since the foregoing description and drawings are merely illustrative, the scope of the invention has been broadly stated herein and it should be liberally interpreted to secure the benefit of all equivalents to which the invention is fairly entitled.

What is claimed is:

1. An automatically activated emergency power supply system for load devices powered by alternating current comprising A. an emergency storage battery,
   B. a single full-wave rectifier conductively coupled to an alternating current power line normally delivering DC charging potential to said emergency storage battery through a first reverse current blocking device,
   C. an inverter oscillator conductively connected to the terminals of said battery and incorporating two alternately conductive electronic amplifying devices each having first and second terminals and capable of being biased into a non-conductive mode by the application of DC bias potential between said terminals of each device,
   D. an "off" bias line connecting one output side of the full-wave rectifier through second reverse current blocking means to the first terminals of both amplifying devices and thereby delivering biasing potential to said first terminals relative to said second terminals at all times when said single full-wave rectifier is activated by normal alternating current line power and thereby maintaining both amplifying devices non-conductively biased to maintain the oscillator in a non-oscillating mode,
   E. said inverter oscillator incorporating an oscillator output transformer with a secondary winding having a first end connected in series with a first high-pass capacitor and having a second capacitor in parallel with said secondary winding and said first capacitor,
   F. an inductive impedance interposed between the junction of said capacitors and an output terminal tap connectable to a first terminal of the alternating current load,
   G. and a second terminal tap connected to the second end of said secondary winding, and connectable to a second terminal of the alternating current load, whereby said amplifying devices are both automatically biased to said non-conductive mode via said "off" bias line during normal operation of the full-wave rectifier, and said "off" bias is automatically removed upon interruption of power on the alternating current power line, activating the inverter oscillator to supply alternating current to the load device.

2. An automatically activated emergency power supply system for load devices powered by alternating current comprising A. a single full-wave rectifier connected to be driven by normally available alternating current from a power line,
   B. a storage battery connected via a first reverse current blocking device across the output of the single full-wave rectifier,
   C. an inverter oscillator circuit incorporating two transistors having first and second terminals and capable of being biased into a non-conductive mode by a bias potential applied across said terminals,
   D. an "off" bias line connecting one output side of the full-wave rectifier through second reverse current blocking means to the first terminals of both transistors and thereby delivering biasing potential to said first terminals relative to said second terminals at all times when said single full-wave rectifier is activated by normal alternating current line power and thereby maintaining both transistors non-conductively biased to maintain the oscillator in a non-oscillating mode,
   E. said inverter oscillator incorporating an oscillator output transformer having a secondary winding having a first end connected in series with a first high-pass capacitor and having a second capacitor in parallel with said secondary winding and said first capacitor,
   F. an inductive impedance interposed between the junction of said capacitors and an output terminal tap connectable to a first terminal of the alternating current load,
   G. and a second terminal tap connected to the second end of said secondary winding, and connectable to a second terminal of the alternating current load, whereby said transistors are both automatically biased to said non-conductive mode via said "off" bias line during normal operation of the full-wave rectifier, and said "off" bias is automatically removed upon interruption of power on the alternating current power line, activating the inverter oscillator to supply alternating current to the load device.

3. An automatically activated emergency power supply system for load devices powered by high frequency alternating current comprising A. a single full-wave rectifier incorporating a smoothing capacitor across its positive and negative DC output terminals driven by normally available alternating current from a power line,
   B. a storage battery connected across the positive and negative output terminals of the single full-wave rectifier, with a first reverse current blocking diode being interposed between the positive terminal of the emergency storage battery and the smoothing capacitor of the full-wave rectifier,
   C. an inverter oscillator circuit incorporating two transistors having their bases connected by at least one primary winding of an output transformer, having their emitters respectively connected to individual windings of the output transformer whose other ends are connected to a first terminal of the emergency storage battery, and having their collectors connected directly together by a common collector line which is connected to a second terminal of the emergency storage battery,
   D. an "off" bias line connecting the junction of the smoothing capacitor and said first reverse current blocking diode through second reverse current blocking means to the bases of both transistors and thereby delivering reverse biasing potential to the emitter-base junctions of said traNsistors at all times when said single full-wave rectifier is activated by normal alternating current line power, and thereby maintaining the oscillator normally in a non-oscillating mode, E. an oscillator output transformer secondary winding incorporating a large plurality of turns having a first end connected in series with a first high-pass capacitor and having a second capacitor in parallel with said secondary winding and said first capacitor, F. an inductive impedance interposed between the junction of said capacitors and an output terminal tap connectable to a first terminal of the alternating current load, G. and a second terminal tap connected to the second end of said secondary winding, and connectable to a second terminal of the alternating current load, whereby interruption of alternating current line power normally delivered to the single full-wave rectifier interrupts the delivery of DC current therefrom to the storage battery and to the "off" bias line, removing the reverse bias from the base-emitter junctions of the transistors and thereby placing the oscillator in its oscillating mode.

* * * * *